US007188902B1

(12) United States Patent
Chen

(10) Patent No.: US 7,188,902 B1
(45) Date of Patent: Mar. 13, 2007

(54) BACKUPHOLSTERY ADJUSTMENT DEVICE FOR WHEELCHAIR

(76) Inventor: Chao-Jen Chen, P.O. Box 697, Fongyuan City, Taichung County (TW) 420

( * ) Notice: Subject to any disclaimer, the term of this patent is extended or adjusted under 35 U.S.C. 154(b) by 108 days.

(21) Appl. No.: 11/103,522

(22) Filed: Apr. 12, 2005

(51) Int. Cl.
*B60N 2/02* (2006.01)

(52) U.S. Cl. .................. 297/357; 297/383; 297/DIG. 4

(58) Field of Classification Search ................ 297/357, 297/376, 354.12, 354.1, 383, 353, 452.33, 297/DIG. 4; 280/250.1
See application file for complete search history.

(56) References Cited

U.S. PATENT DOCUMENTS 5,593,211 A * 1/1997 Jay et al. .................... 297/383
5,603,682 A * 2/1997 Grider ........................ 482/142
5,848,824 A * 12/1998 Mocur ..................... 297/440.2
5,906,416 A * 5/1999 Rasmussen ............ 297/452.33
5,944,385 A * 8/1999 Pearce ................... 297/354.12
6,095,612 A * 8/2000 Man ...................... 297/452.33

* cited by examiner

*Primary Examiner*—Milton Nelson, Jr.

(57) ABSTRACT

A backupholstery adjustment device for a wheelchair includes a wheelchair having a horizontally and/or obliquely adjusted backupholstery which has a pair of upper positioning rods and a pair of lower positioning rods spacedly secured to a plurality of V-shaped linking plates on inward arcuate lateral sides thereof, a pair of upper and a pair of lower adjustment pieces respectively secured to the upper and lower portions of a pair of L-shaped handles through a plurality of clamping plates. The upper adjustment pieces each has a slit abutting a stopping portion in the top insertable by the pair of upper positioning rods and a plurality of grooves formed inside for selectively engaging the upper positioning rods. The lower adjustment pieces each has a slit abutting a stopping portion, too, insertable by the pair of lower positioning rods and a single groove engageable within the lower positioning rods. In an alternate arrangement, both the upper and lower adjustment pieces having a plurality of positioning grooves.

4 Claims, 9 Drawing Sheets

BACKUPHOLSTERY ADJUSTMENT DEVICE FOR WHEELCHAIR

BACKGROUND OF THE INVENTION

The present invention relates to the medical healthy wheelchair and more particularly to the backupholstery adjustment device for wheelchair which is able to horizontally and obliquely adjust the backupholstery to suit different height or fat of the crippled people.

The wheelchair is a means of transportation for the crippled. It is readily foldable and presents a display that is very convenient for use. However, the back of the chair is solid and cannot be adjusted. As such, the back of the chair may not be suitable to the different height and weight of users. It also may not be suitable for the handicapped. As we know that improper sitting posture is uncomfortable on the back of the patient and sometimes makes the user's back not straight. Thus, only the adjustable backupholstery of the wheelchair can solve this problem.

SUMMARY OF THE PRESENT INVENTION

The present invention has a main object to provide a backupholstery adjustment device for a wheelchair which is capable of adjusting the backupholstery horizontally and obliquely to suit to different height or weight of the users.

Accordingly, the backupholstery adjustment device for the wheelchair of the present invention comprises a pair of front and large wheels, several seat rails and a pair armrests. The backupholstery is slightly arcuate, so that the lateral sides of the backupholstery each connect a pair of V-shaped linking plate. The feature is in that the linking plates each has a positioning rod for positioning a pair of upper adjustment pieces and a pair of lower adjustment pieces on two L-shaped handles. The upper and lower adjustment pieces each has a slit and at least a positioning groove such that the positioning rods on the vertical portion of the handles may respectively engage with the slits in the upper and lower adjustment pieces which have a stopping portion for preventing the positioning rods from sliding outward but engages within the positioning grooves. The backupholstery may be move horizontally and/or obliquely as the positioning rods selectively engage the positioning grooves foreword or backward relative to the adjustment pieces.

The present invention will become more fully understood by reference to the following detailed description thereof when read in conjunction with the attached drawings.

DETAILED DESCRIPTION OF THE PREFERRED EMBODIMENT

Figure 1:
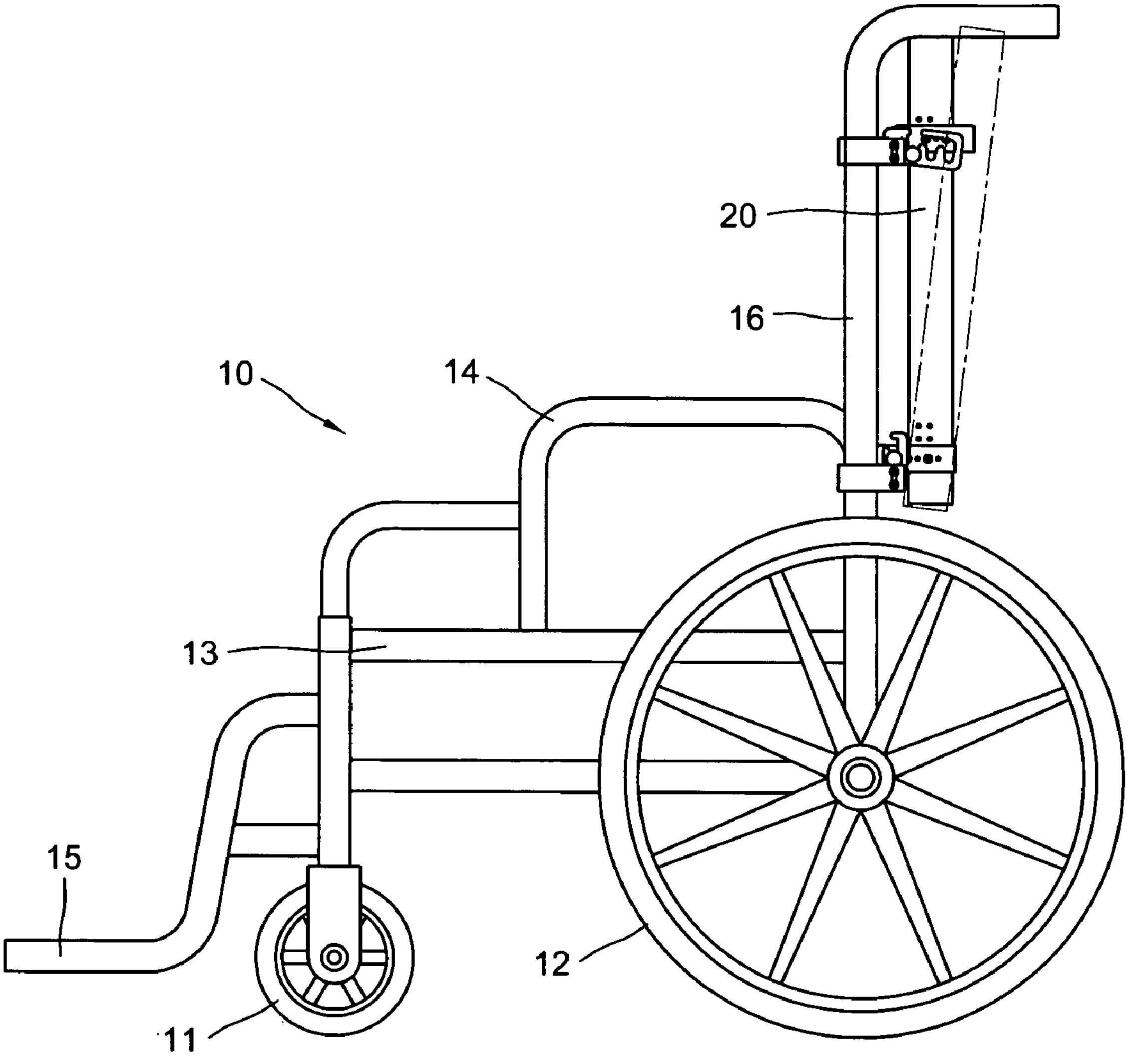
FIG. 1 is a plane view of the preferred embodiment of the wheelchair of the present invention.
Figure 2:
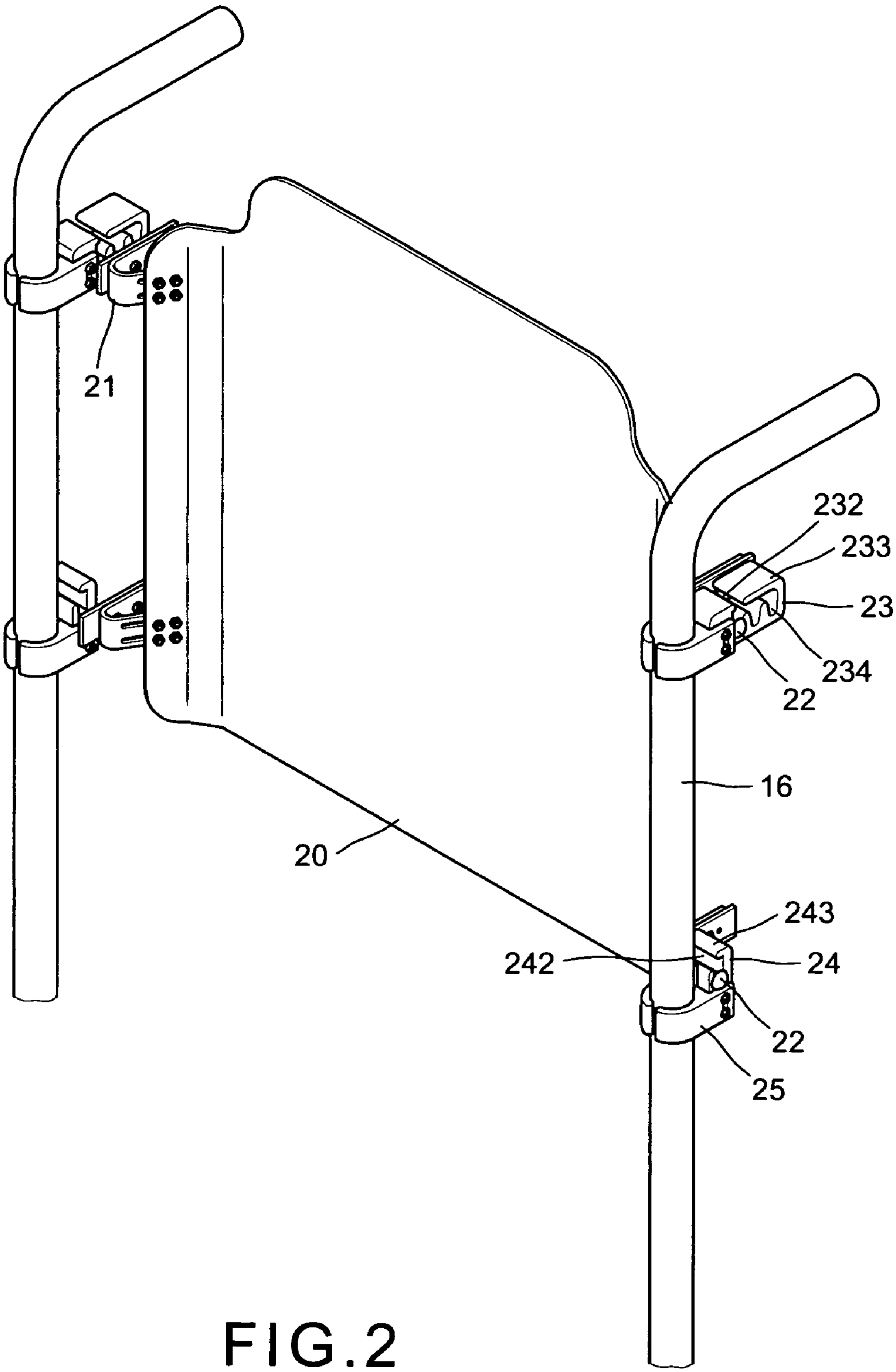
FIG. 2 is a perspective view showing the assembly of the adjustment pieces onto the vertical portion of the L-shaped handles.
Figure 3:
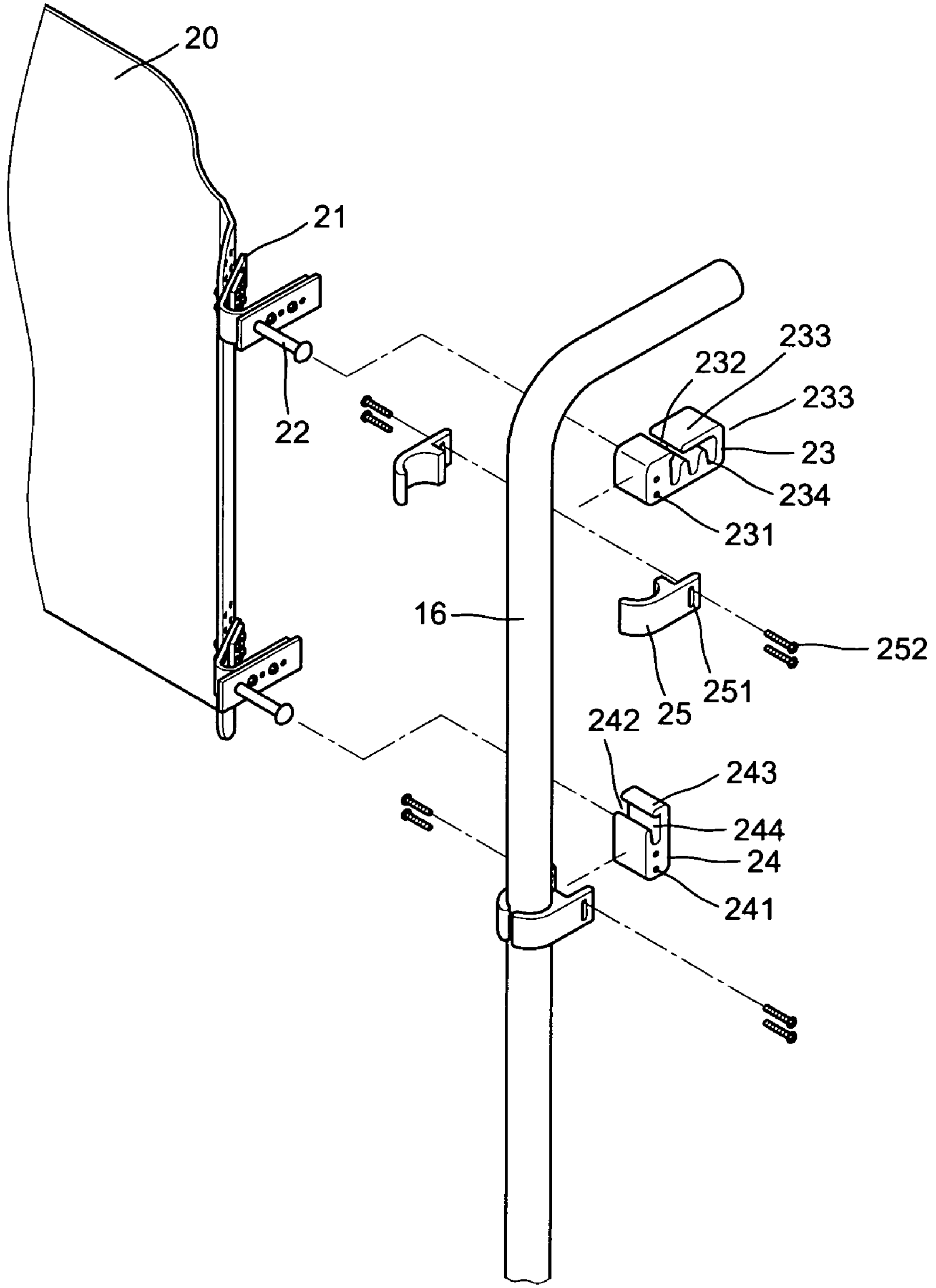
FIG. 3 is an exploded perspective view of the relationship between the adjustment pieces, the handles.
Figure 4:
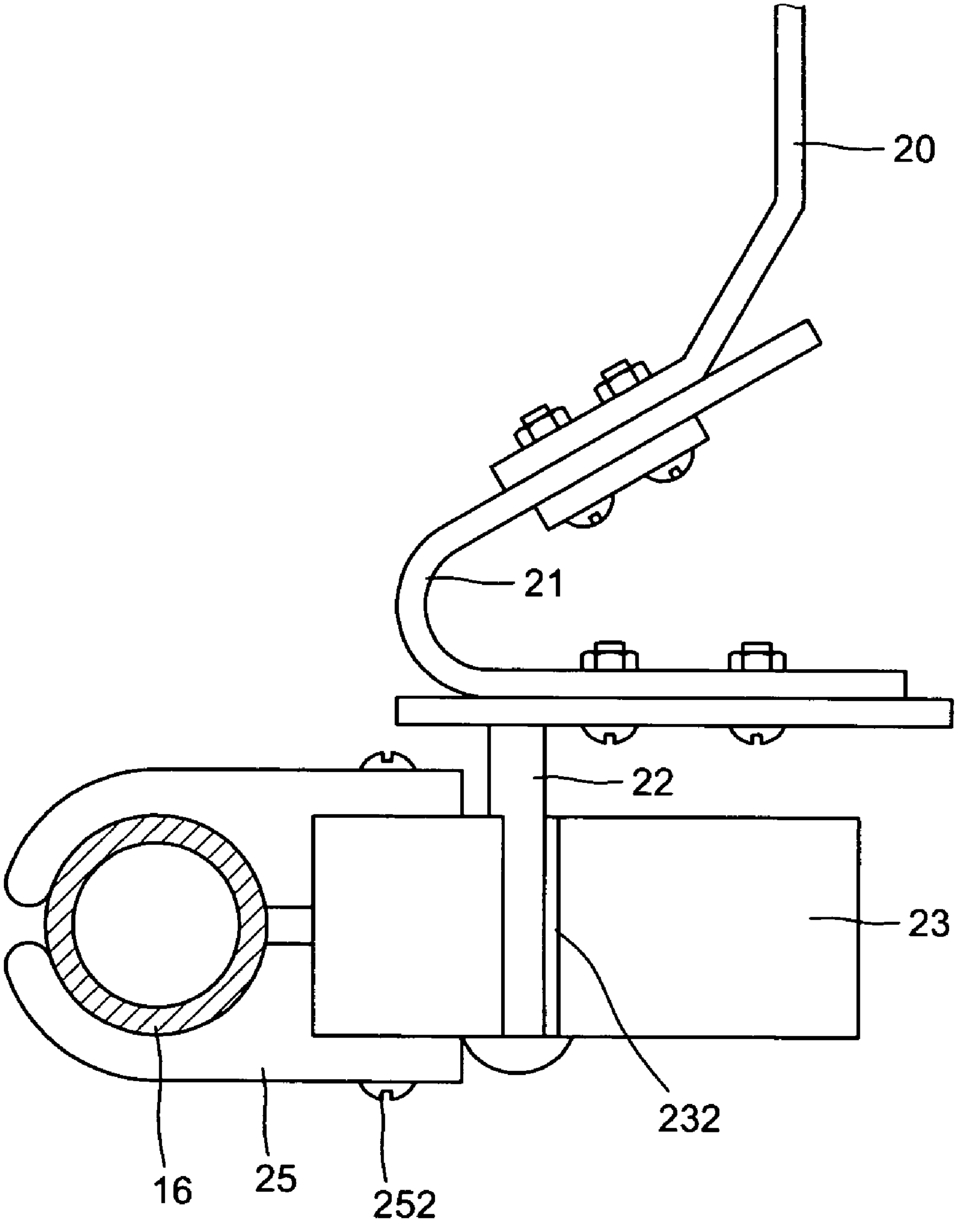
FIG. 4 is a top view of the present invention.

With reference to the drawings and initiated from FIGS. 1 to 3, the backupholstery adjustment device for a wheelchair of the present invention comprises a wheelchair 10 having a pair of front wheel 11, a pair of large wheel 12, a plurality of seat rails 13, a pair of armrests 14, a pair of foot rests 15 and a pair of L-shaped handles 16 and a backupholstery 20 positioned between the pair of handles 16. The backupholstery has arcuate portions on lateral sides for disposing two pairs of linking plates 21 which have a V-shaped section (as shown FIG. 4). The linking plates 21 each includes a positioning rod 22. Upper and lower adjustment pieces 23 and 24 are spacedly secured to the vertical portion of the L-shaped handles 16 by a pair of symmetrical clamping plates 25. The clamping plates 25 each has a vertical slot 251 facing each other and secured by a pair bolts 252 and nuts through the holes 231 and 241 of the upper and lower adjustment pieces 23 and 24. The upper adjustment piece 23 has a slit 232 in the top communicating to inside, a stopping portion 233 beside the slit 232 and a plurality of positioning groove 234 formed inside thereof. The lower adjustment piece 24 has also a slit 242 in a top beside a stopping portion 243 and a positioning groove 244 under the slit 242. Both the positioning grooves 234 and 244 respectively engage with the positioning rods 22 of the upper and lower linking plates 21 and movably receive the positioning rods 22.

Figure 5:
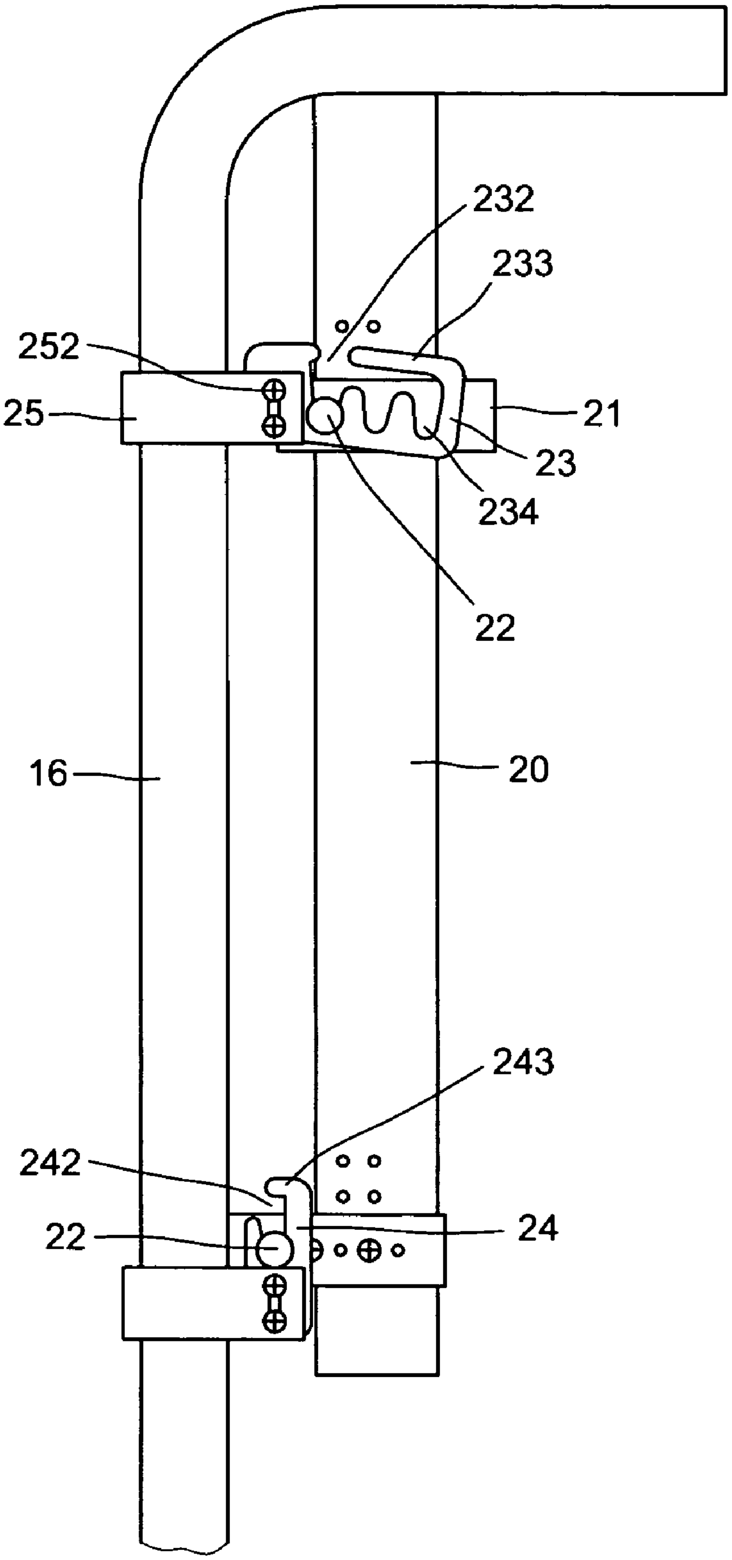
FIG. 5 is a plane view showing the position of the positioning rods.
Figure 6:
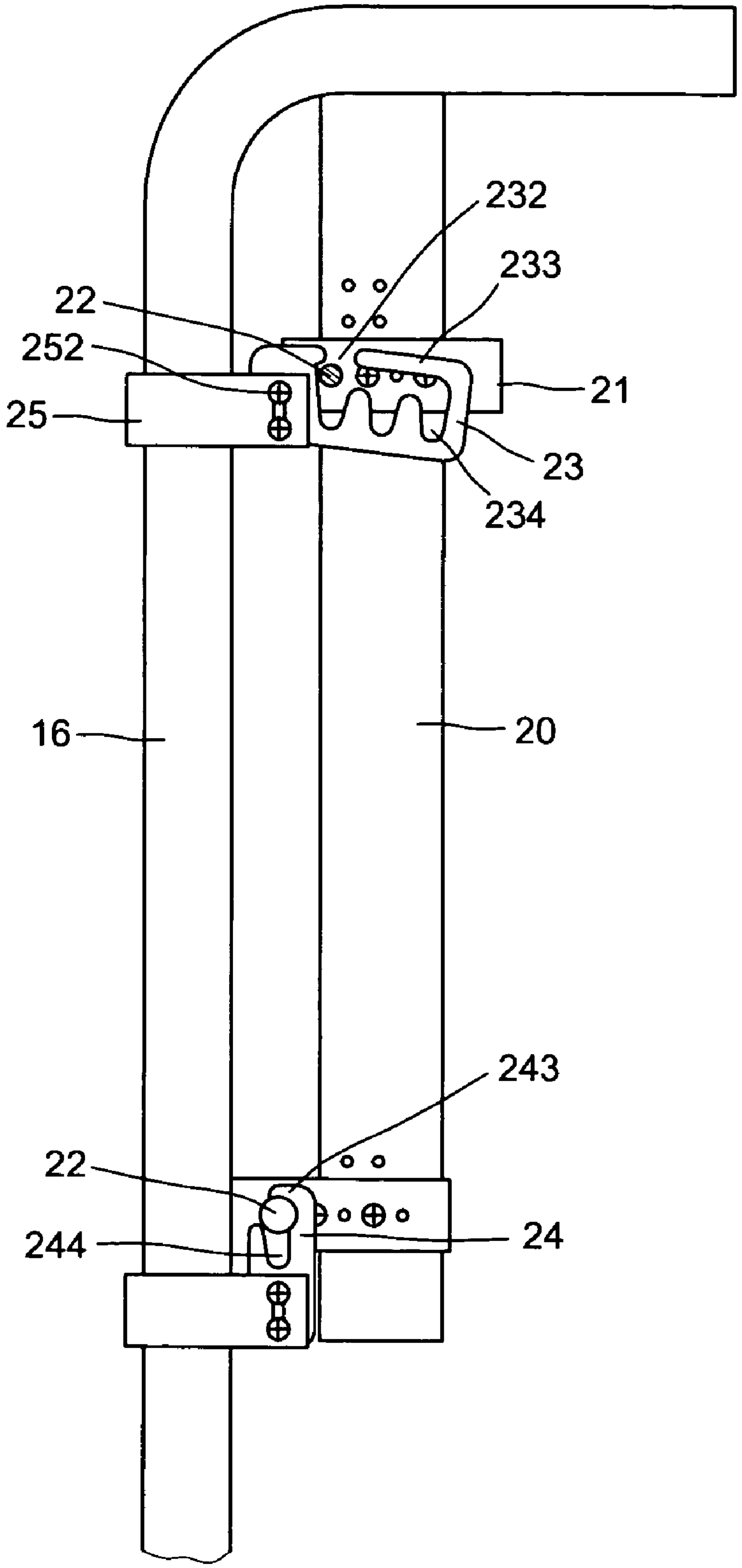
FIG. 6 is a plane view to show the operation of the present invention.
Figure 7:
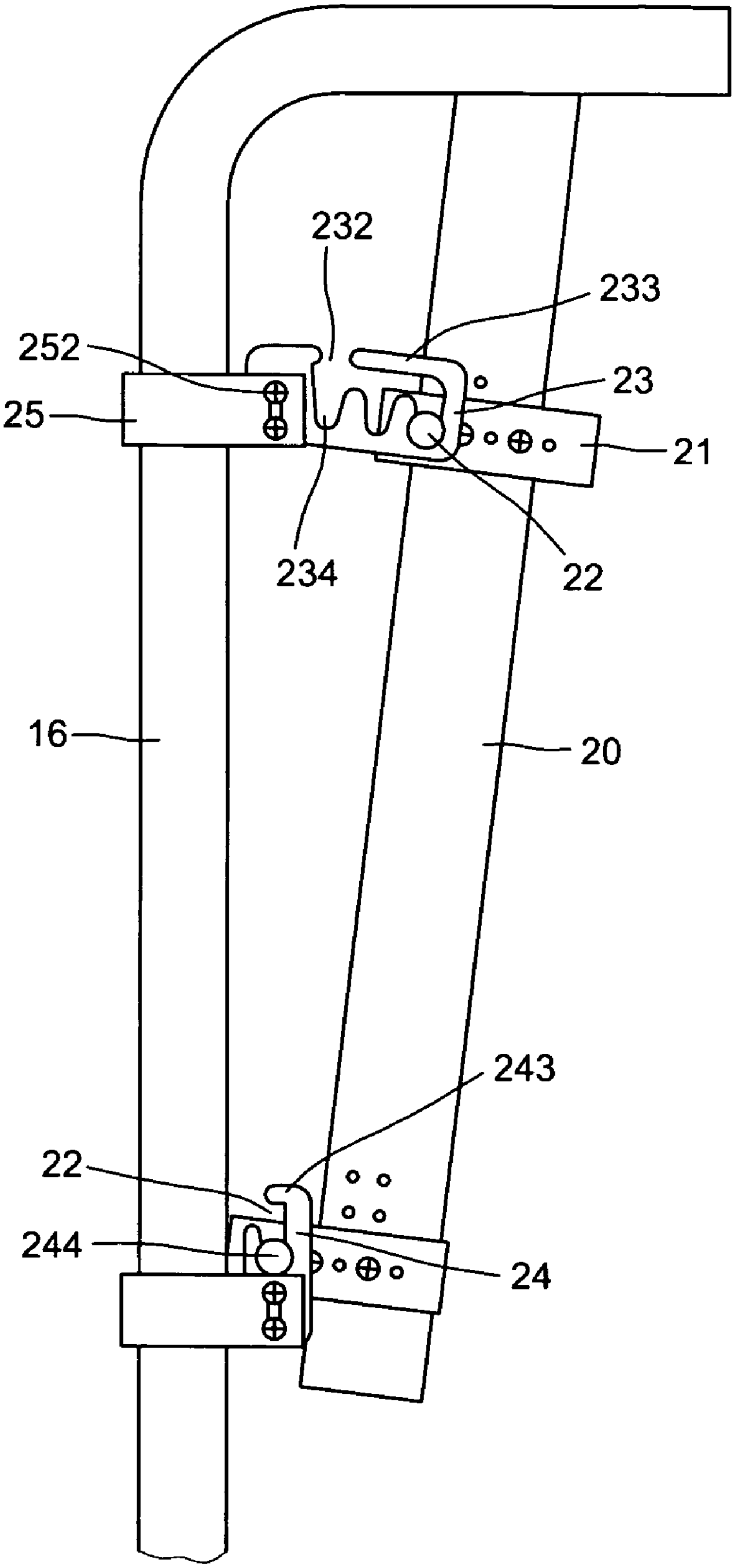
FIG. 7 is a plane view to show that the backupholstery is moved obliquely.

Based on the afore-discussed structure, the assembly of the backupholstery 20 to the handles 16 as shown in FIG. 5 which shows that the user just inserts the four positioning rods 22 on two lateral side hereof into the slits 232 and 242 of the upper and lower adjustment pieces 23 and 24. The positioning rods 22 are automatically engaged within the groove 234 and 244. The backupholstery 20 is movably held by the adjustment pieces 23 and 24 respectively. The backupholstery will not easily break away due to the stopping portions 233 and 243 of the adjustment pieces 23 and 24. When adjusting (as shown in FIGS. 6 and 7) the backupholstery into an oblique angle, the user slightly lifts the backupholstery upward to facilitate the positioning rods 22 to break away from the positioning grooves 234 and 244 and to tilt the top of the backupholstery backward seeking for a desired angle then to release the backupholstery 20. Whereby, the lower positioning rods 22 automatically back to its original grooves 244, but the upper positioning rods 22 are moved to another positioning groove 234 in the upper adjustment pieces 23.

If performing horizontal adjustment, one has to move the bases of the positioning rods 22 foreword or backward relative to the V-shaped linking plates 21.

Figure 8:
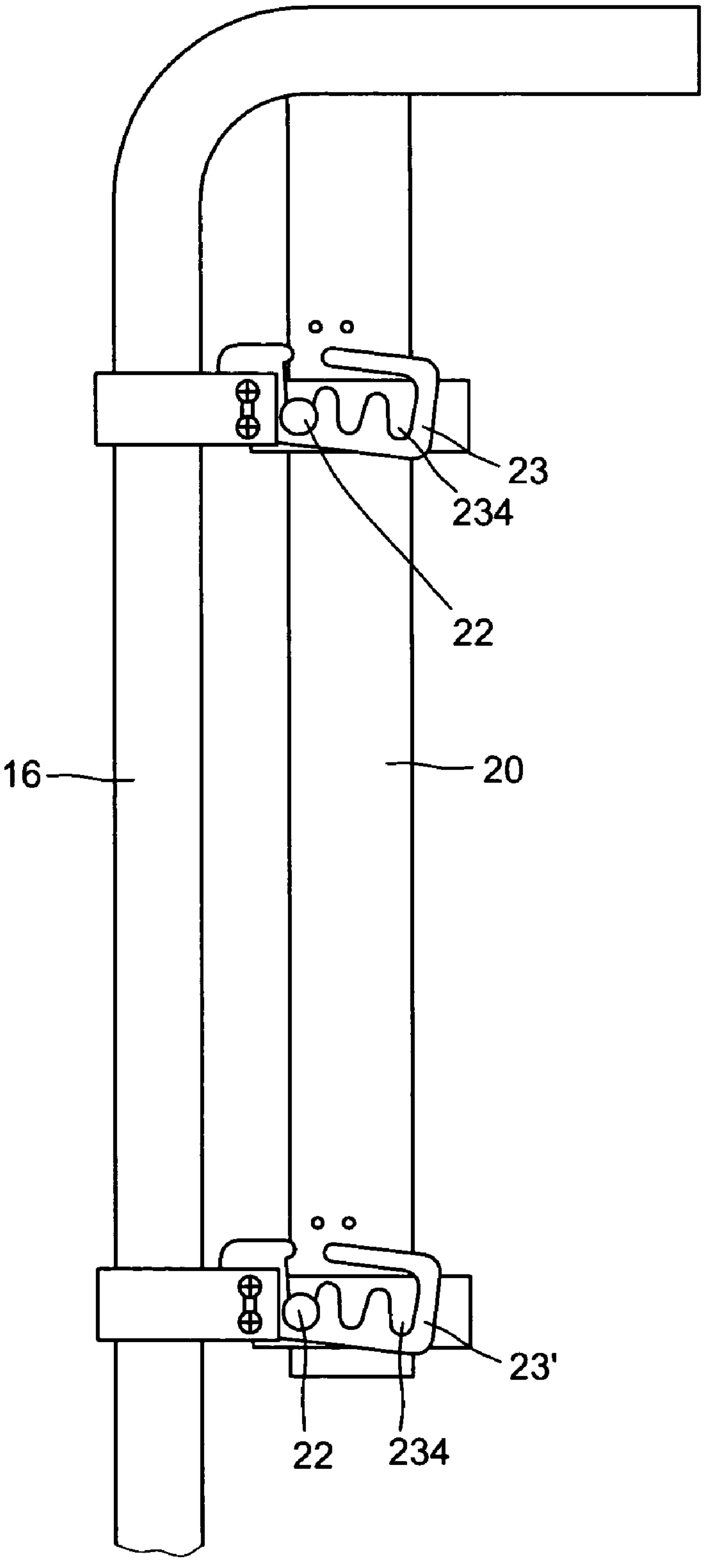
FIG. 8 is a plane view of an alternate arrangement of the lower adjustment pieces.
Figure 9:
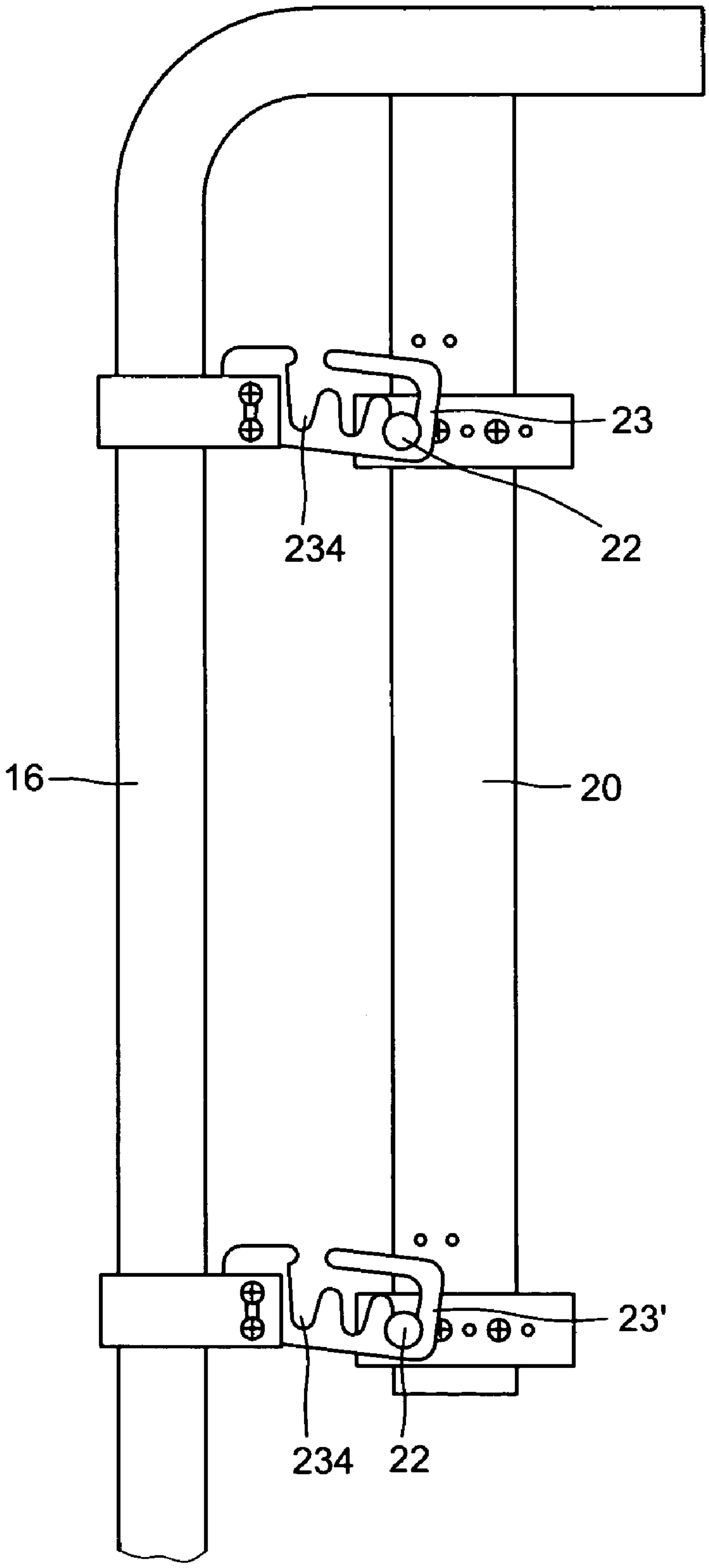
FIG. 9 is a plane view to show that the backupholstery is horizontally moved a distance.

Referring to FIGS. 8 and 9 of the drawings, an alternate arrangement of the lower adjustment pieces is provided, in which the lower adjustment pieces 24 are removed and instead includes a pair of alternate adjustment pieces 23' which is structurally identical to the upper adjustment pieces 23. Upon this modification, the backupholstery 20 may either be obliquely adjusted or horizontally adjusted so as to serve for difficult height or weight of the user. FIG. 9 shows a horizontal adjustment of the backupholstery 20.

Note that the specification relating to the above embodiment should be construed as exemplary rather than as limiting of the present invention, with many variations and modifications being readily attainable by a person of average skill in the art without departing from the spirit or scope thereof as defined by the appended claims and their legal equivalents.

I claim:

1. A backupholstery adjustment device for a wheelchair comprising:

a pair of front wheels, a pair of large wheels, a plurality of rails, a pair of armrests, a pair of footrests, a pair of L-shaped handles and an adjustable backupholstery which has a pair of inwardly arcuate lateral sides;

two pairs of V-shaped linking plates symmetrically and spacedly secured to upper and lower portions of said inwardly arcuate lateral sides, each having a positioning rod with a rectangular base movably secured to an outer side thereof by screws;

two pairs of symmetrical clamping plates symmetrically and spacedly secured to an upper and a lower portion of the pair of L-shaped handles positioned in registry with said V-shaped linking plates and each having a vertical slot facing each other;

a pair of upper adjustment pieces each having a pair of through holes adjacent an inner end thereof and engaged with the vertical slots of said clamping plates and respectively secured to said clamping plates by bolts and nuts, a slit which is insertable by said positioning rods, a stopping portion abutting said slits and a plurality of positioning grooves positioned inside thereof engageable with said positioning rods;

a pair of lower adjustment pieces each having a pair of through holes adjacent a lower end thereof and engaged with the vertical slot of said lower clamping plates and secured to said lower clamping plates by bolts and nuts, a slit abutting a stopping portion on top and a single positioning groove formed inside;

whereby, said backupholstery is movably supported by said upper and lower adjustment pieces and inserting said positioning rods respectively into said slits and engaged within said positioning grooves.

2. The backupholstery adjustment device as recited in claim 1, wherein said positioning rods may be moved to any positioning grooves in said upper adjustment pieces to accomplish tilting adjustment.

3. The backupholstery adjustment device as recited in claim 1, wherein said backupholstery may be horizontally adjusted by moving said positioning rods horizontally relative to said V-shaped linking plates.

4. The backupholstery adjustment device as recited in claim 1, wherein said lower adjustment pieces may be replaced with additional upper adjustment pieces to facilitate to perform both oblique and horizontal adjustment for said backupholstery.

* * * * *